United States Patent [19]

Haury

[11] 4,082,348

[45] Apr. 4, 1978

[54] ADJUSTABLE WHEEL CHAIR

[75] Inventor: Gilbert E. Haury, Litchfield, Ohio

[73] Assignee: Invacare Corporation, Elyria, Ohio

[21] Appl. No.: 662,892

[22] Filed: Mar. 1, 1976

[51] Int. Cl.[2] .............................................. B62M 1/14

[52] U.S. Cl. ................................ 297/45; 297/DIG. 4

[58] Field of Search ...................... 297/42, 44, 45, 441, 297/457, 218, DIG. 4, 345; 108/118; 160/DIG. 18

[56] References Cited

U.S. PATENT DOCUMENTS

| | | | |
|---|---|---|---|
| 1,152,987 | 9/1915 | Spalding | 108/118 |
| 2,379,566 | 7/1945 | Duke | 297/45 |
| 2,669,289 | 2/1954 | Usher et al. | 297/45 |
| 2,797,738 | 7/1957 | Patterson | 297/345 |
| 2,914,111 | 11/1959 | Mize | 297/45 |
| 2,930,429 | 3/1960 | Mize | 297/45 |
| 3,215,469 | 11/1965 | Wamsley | 297/DIG. 4 |
| 3,761,126 | 9/1973 | Mulholland | 297/DIG. 4 |
| 3,853,372 | 12/1974 | Meyer | 297/45 |
| 3,937,490 | 2/1976 | Nasr | 297/45 |

*Primary Examiner*—Roy D. Frazier
*Assistant Examiner*—Peter A. Aschenbrenner
*Attorney, Agent, or Firm*—Fay & Sharpe

[57] ABSTRACT

An adjustable wheel chair which facilitates independent seat height and width adjustments to accommodate varying wheel chair size needs. The wheel chair includes a pair of side frame assemblies transversely movable relative to each other between a first closed position with the side frame assembly closely spaced to each other and a second opened position with the side frame assembly spaced apart from each other. The side frame assemblies each include upper and lower frame members and means for selectively adjusting the distance between these members to vary the height of a seat disposed adjacent the upper frame members. First and second cross brace assemblies are pivotally connected to each other generally at their midpoints and mounted transversely between the side frame assemblies in a manner so as to form a collapsible X-like configuration. Each cross brace assembly includes means for selectively adjusting the length thereof to thereby permit adjustment of the distance between the side frame assemblies when they are in the second position to thereby vary the width of the seat and seat back areas. Each cross brace assembly includes a seat bar member at the uppermost end thereof and to which a flexible seat is mounted. The seat bar members are disposed immediately adjacent an associated one of the upper frame members when the side frame assemblies are in the second position and are spaced vertically above the associated upper frame member when the side frame assemblies are moved to the first position. Guide means are employed to guide the seat bar members as the side frame assemblies are moved between the first and second positions. The seat and a flexible seat back include means for releasably accommodating flexible spacer members when the seat and seat back areas are widened by adjusting the lengths of the cross brace assemblies. An adjustable head rest structure may also be included for the comfort of the wheel chair user.

13 Claims, 11 Drawing Figures

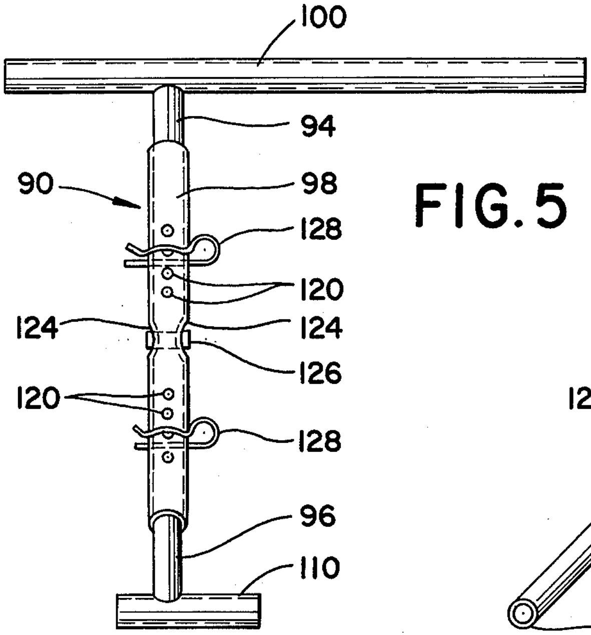
FIG. 5
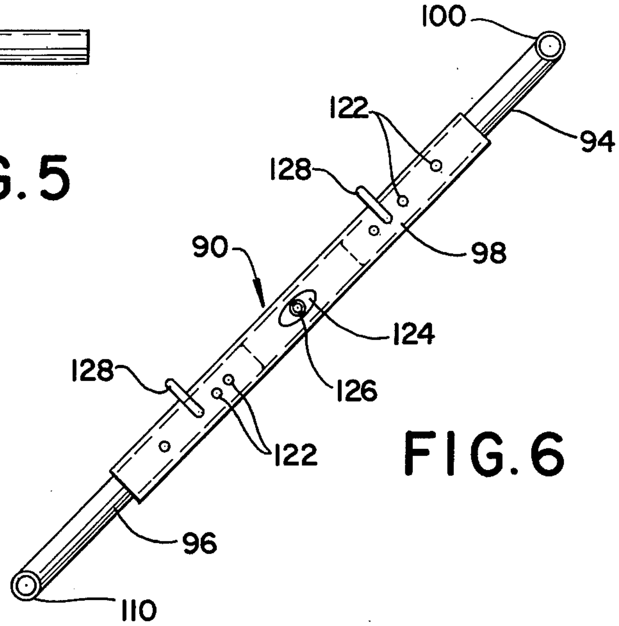
FIG. 6
FIG. 8
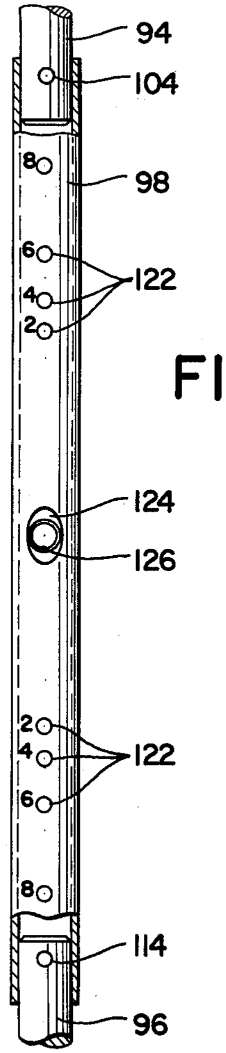
FIG. 7
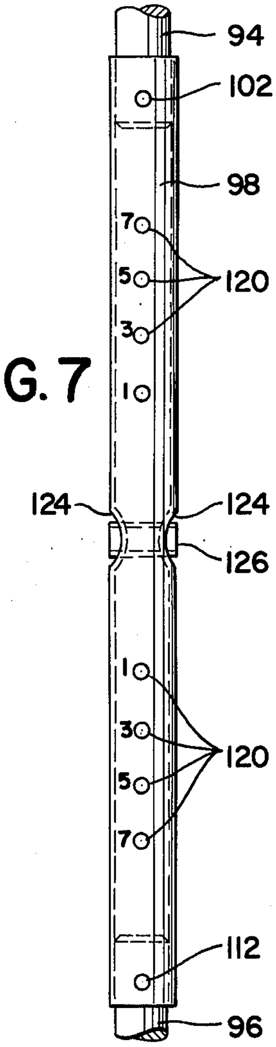
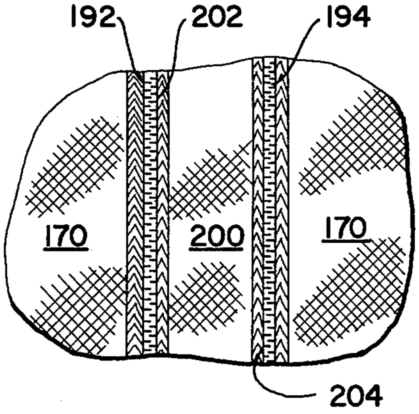
FIG. 9

ADJUSTABLE WHEEL CHAIR

BACKGROUND OF THE INVENTION

This invention pertains to the art of wheel chairs and more particularly to adjustable wheel chairs.

The invention is particularly applicable to adjustable wheel chairs of the type which may be folded between a normal opened or use position and a closed or storage position and which further allow some type of seat height and/or width adjustment and will be described with particular reference thereto; however, it will be appreciated by those skilled in the art that the invention has broader applications and could be advantageously employed in other environments.

Heretofore, there have been any number of collapsible wheel chair designs which have been introduced and met with commercial success. Some of these prior collapsible wheel chair designs have had fixed seat heights and widths so that many different sizes would be required to properly accommodate specific needs of users thereof. Some prior designs have attempted to reduce the number of sizes required to properly service height or seat width adjustment so as to create a more universal type of wheel chair adaptable to the specific needs of many situations. However, prior collapsible and adjustable wheel chair designs have only made provision for either seat height or seat width adjustments but not height and width adjustments independent of each other which would render the wheel chairs truly universal ones. Those prior designs attempting to provide both seat height and width adjustments were such that the height and width dimensions were both necessarily simultaneously altered when making any adjustments allowed.

Accordingly, it has been desired in the industry to develop a wheel chair design which would be universal from the standpoint that the seat height and width dimensions could be altered completely independent of each other. Such a design would then permit a substantial reduction in the separate types and sizes of wheel chairs stocked by hospitals, rental agencies, medical supply houses and the like since such a design could be successfully utilized in satisfying the various and specific needs of patients or users. Since there is no correlation between the height and width or breadth characteristics between different people, the desirability for having independent seat height and width adjustments are amplified. A universal wheel chair design would be able to eliminate special or separate wheel chairs required to accommodate, for example in the extreme situations, short and unusually heavy or wide persons and tall but unusually thin persons. Moreover, a truly universal wheel chair would facilitate height and width adjustments to suit the individual personal preferences of users and which have not been heretofore available.

The subject invention contemplates a new and improved apparatus which overcomes those problems noted above and provides a new adjustable wheel chair which is simple in design, economical to manufacture, readily adaptable to use in any number of situations and environments and which provides independent seat height and width adjustments.

DESCRIPTION OF THE PRESENT INVENTION

In accordance with the present invention, there is provided a new and improved adjustable wheel chair structure which permits independent seat height and width adjustments. The wheel chair structure includes a pair of side frame assemblies disposed in a spaced apart side by side relationship with each of the side frame assemblies having upper and lower frame members rigidly interconnected to front and rear frame members. The front and rear frame members are each comprised of first and second portions with one of the first and second portions longitudinally movable relative to each other. First locking means cooperate between the first and second portions of the front and rear frame members for selectively locking the first and second portions relative to each other for varying the effective length of these frame members and the distance between the upper and lower frame members. The structure includes a front wheel operably disposed adjacent each of the front frame members and a rear wheel operably disposed adjacent each of the rear frame members. First and second cross brace assemblies are pivotally connected to each other and extend generally transversely between the side frame assemblies and form a collapsible, generally X-like configuration. Each cross brace assembly includes first and second cross brace portions with one of the first and second portions being longitudinally movable relative to the other of the portions. One end of one cross brace assembly is pivotally mounted to the lower frame member of one side frame assembly with the other end thereof extending to a position adjacent the upper frame member of the other side frame assembly and one end of the other cross brace assembly is pivotally mounted to the lower frame member of the other side frame assembly with the other end thereof extending to a position adjacent the upper frame member of the one side frame assembly. The cross brace assemblies permit selective movement of the side frame assemblies relative to each other between a first closed position with the side frame assemblies closely spaced relative to each other and a second opened position with the side frame assemblies spaced apart from each other. Second locking means cooperate between the first and second cross brace portions of both cross brace assemblies for selectively locking the portions in a desired relationship with each other in order to vary their effective length and the effective distance between the first and second side frame assemblies when the assemblies are moved to the second position. A seat extends between the side frame assemblies and is operably connected to the cross brace assemblies at the uppermost ends thereof and a seat back extends between the rear frame members of the side frame assemblies. Guide means are provided for guiding the uppermost ends of the cross brace assemblies in a generally vertical direction as the side frame assemblies are moved between the first and second positions.

In accordance with another aspect of the present invention, the cross brace assemblies are each comprised of two first cross brace portions and one second cross brace portion with the first cross brace poritions being telescopically located with regard to the associated second cross brace portion at opposite ends thereof. The second and both first cross brace portions of each cross brace assembly include locking means which permit the first cross brace portions to be axially adjusted relative to the associated second cross brace portion.

In accordance with another aspect of the present invention, the cross brace assemblies each includes an elongated seat mounting bar disposed at the uppermost end thereof with the side edges of the seat being mounted thereto. The seat mounting bars extend generally parallel to the upper frame members of the side frame assemblies and each mounting bar is moved to a position spaced generally vertically above an associated upper frame member when the side frame assemblies are moved to the first closed position. The seat mounting bars are then moved to a position adjacent the associated upper frame member when the side frame assemblies are moved to the second opened position with the guide means guiding the seat mounting bars through generally vertical planes as the side frame assemblies are moved between the first and second positions.

In accordance with still another aspect of the present invention, the seat and seat back include means for selectively altering or adjusting the widths thereof to accommodate seat width adjustments made possible by the wheel chair structure.

In accordance with a further aspect of the invention, an adjustable head rest arrangement may also be provided for the personal comfort of the wheel chair user.

The present invention is deemed to provide many advantages over prior adjustable wheel chair structures of this general type. One advantage is that the seat height and width dimensions are independently adjustable so as to provide a universal type wheel chair structure. Another advantage accruing from the subject new wheel chair design is that it permits hospitals, rental facilities, medical supply houses and the like to stock fewer individual and specially sized wheel chairs than has heretofore been possible with prior adjustable wheel chair designs. Another advantage to the subject invention is the provision of a universally adjustable wheel chair which is simple in design and relatively easy to manufacture.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 5 is a side elevational view of one cross brace assembly;

FIG. 6 is a front view of the cross brace assembly shown in FIG. 5;

FIG. 7 is a view showing one side of the second cross brace portion of one cross brace assembly with the ends of the second cross brace portions inserted in an unattached manner thereto;

FIG. 8 is a view showing the side of the second cross brace portion in FIG. 7 rotated 90° therefrom;

FIG. 9 is a partial view showing the seat back with a flexible spacer releasably mounted thereinto;

DESCRIPTION OF THE PREFERRED EMBODIMENT

Figure 2:
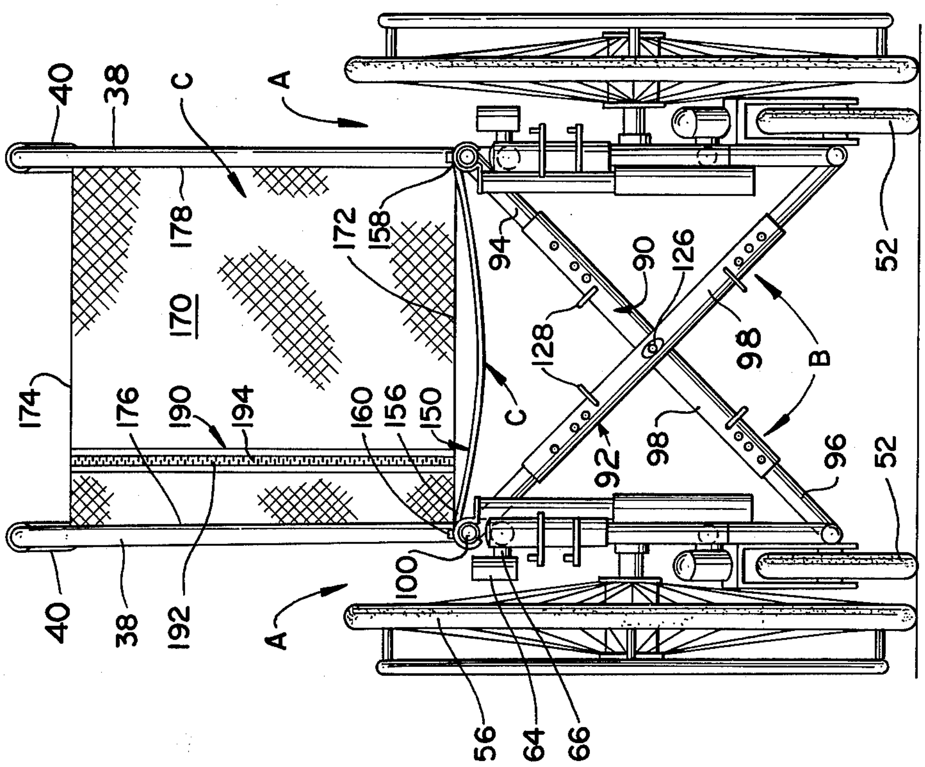
FIG. 2 is a front view of the wheel chair shown in FIG. 1.

Referring now to the drawings wherein the showings are for purposes of illustrating the preferred embodiment of the invention only and not for purposes of limiting same, the FIGURES show a wheel chair comprised of a pair of spaced apart side frame assemblies A, a pair of pivotally interconnected cross brace assemblies B in operative communication with the side frame assemblies and seat and seat back assemblies C.

In view of the fact that the side frame assemblies A are identical, description will hereinafter be made with reference to one of these assemblies, it being understood that the other is identical thereto unless otherwise specified. Accordingly, and with reference to FIGS. 1–4, the side frame assembly is comprised of an upper frame member 10, a lower frame member 12, a front frame member 14 and a rear frame member 16. Lower frame member 12 is, in the preferred embodiment, comprised of a rear portion 18 and a front, arcuate portion 20 in order to provide a clearance area for the front wheel as will be best seen in FIG. 1. The various frame members are conveniently constructed from a rigid thin walled tubing and interconnected with each other by conventional means such as welding or brazing. Typically, the tubing will comprise steel tubing although other materials could also be advantageously employed.

Front frame member 14 is itself comprised of a first portion 30 and a second portion 32 with the first poriton being closely slidably received in the second poriton so as to form a telescoping arrangement. Rear frame member 16 is also comprised of a first portion 34 and a second portion 36 again, with the first portion being closely slidably received in the second portion so as to form a telescoping arrangement. First portion 34 is received in an elongated seat back support or frame member 38 adjacent the intersection of first portion 34 and upper frame member 10. Seat back or frame member 38 is formed or curved slightly over the length thereof in order to form a seat back framework with the outermost ends thereof extending generally outwardly from the wheel chair so as to form a typical hand grip area 40. This hand grip area may, of course, receive or be fitted with a rubber or plastic handle grip as is also shown. In the preferred embodiment, seat back support or frame member 38 comprises a separate member rigidly affixed to first portion 34 of rear frame member 16; however, it will be appreciated that a one piece construction could be utilized by simply lengthening first portion 34 so as to include support or frame member 38.

Cooperating between first and second portions 30, 32 and 34, 36 of both front and rear frame members 14, 16 is a first locking means generally designated 42 which is employed to selectively adjust the telescoping relationship between the first and second portions to thereby allow adjustment of the distance between the upper and lower frame members 10, 12. Since these first locking means are identical, description will be made with reference to FIGS. 3 and 4 and to the locking means associated with first and second portions 30, 32 of front frame member 14, it being understood that the others are identical thereto unless otherwise specifically noted.

The locking means is comprised of a bottom or locking member 44 mounted on the inside of first portion 34 to extend outwardly thereof through a small opening. This locking member is acted upon by a spring or other biasing means 46 to continuously urge it so as to extend outwardly of the first portion. Second portion 32 includes a plurality of locking member receiving openings 48 extending longitudinally therealong for selective registry with button or locking member 44 to achieve the desired adjusted position between the components. When it is desired to alter the adjusted position, it is simply necessary to push the button or locking member 44 inwardly of its engagement through the particular receiving opening 48 in order that there may again be telescopic movement between first and secon portions 30, 32 to still another adjusted position. Locking member receiving openings 48 in both second portions 32, 36 have identical spacing therebetween in order that upper frame member 10 may be uniformly adjusted over a range of settings with both first and second portions 30, 32 and first and second portions 34, 36 being locked together at any of these adjusted positions. In the preferred embodiment of the invention, locking means 42 and locking openings 48 are disposed on the inside of the side frame assemblies in order that they cannot be accidently hit or nudged to move them from their adjusted positions.

Conveniently mounted to the side frame assembly A adjacent the interconnection between front frame member 14 and arcuate member 20 of lower frame member 12 is a front wheel or caster receiving and mounting cylinder 50. This cylinder comprises a piece of tubing adapted to closely receive the upper mounting peg or end of a conventional wheel or caster 52. The relationship between the caster and mounting cylinder 50 is such that the caster may be rotated about the axis of the cylinder in order to provide ease of steering for the wheel chair itself as is known.

A rear wheel axle lug 54 is rigidly affixed to second portiion 36 of rear frame member 16. This lug has a threaded opening therein to retainingly receive in a conventional manner the axle for an enlarged conventional rear wheel 56. This wheel may take the shape and size of any number or types of known wheel chair wheels and the lug is disposed so that the wheel is operably positiioned in a plane generally parallel to the plane of side frame assembly A itself.

Mounted to front and rear frame members 14,16 and generally at the intersections thereof with upper frame member 10 are generally cylindrical socket tube members 60, 62, 64. Each of these socket tubes is rigidly affixed to the side frame assembly by a mounting member 66 in a convenient manner such as welding, brazing or the like. Socket tubes 60, 62 and 64 are adapted to receive arm rest or other supportive equipment which may be required for a particular patient or person utilizing the wheel chair. Upper and lower hinge plates 68, 70 are rigidly mounted to second portion 32 of front frame member 14 to extend outwardly from the side frame assembly. Each of these hinge plates includes upwardly extending hinge pins 72, 74, respectively, for mounting leg and foot supports for the comfort and convenience of the wheel chair user. Inasmuch as such supports, as well as the ancillary equipment utilized with socket tubes 60, 62, and 64 are conventional and do not form a part of the present invention, they are not shown or described in further detail herein.

Affixed to front arcuate portion 20 of lower frame member 12 so as to extend in an upward direction generally parallel to front and rear frame members 14, 16 is a seat guide assembly generally designated 80. This assembly is comprised of a guide receiver portion 82 which is rigidly affixed to front arcuate portion 20 and which receives one end of an elongated guide member 84. The outer end of the guide member communicates with the seat assembly as will be described in greater detail hereinafter. Seat guide assembly 80 is also constructed from thin walled tubing with guide 84 being closely slidably received within guide receiver member 82.

With particular reference to FIGS. 1–4, cross brace assemblies B are comprised of a first cross brace assembly 90 and a second cross brace assembly 92 which are pivotally connected with each other. Inasmuch as assemblies 90, 92 have the same overall structure, description will hereinafter be made with reference to one of them, it being understood that the other is identical thereto unless otherwise specifically noted. Referring particularly to FIGS. 5–8, cross brace assembly 90 is comprised of a pair of first cross brace portions 94, 96 telescopically received within a second cross brace portion 98. Portions 94, 96 and 98 are preferably constructed from a rigid thin walled tubing dimensioned so that the first portions are closely slidably received into opposite ends of the second portion.

First cross brace portion 94 includes an elongated seat bar member 100 rigidly affixed to the outermost end thereof and a pair of locking member receiving openings 102, 104 adjacent the innermost end thereof. As will be seen from FIGS. 5–8, openings 102, 104 extend completely through first cross brace portion 94 but are spaced 90° apart from each other. The reason for utilizing two openings, as well as their 90° spacing, will be described in further detail hereinafter.

First cross brace portion 96 includes a lower frame member portion 110 rigidly affixed to the outer end thereof and locking member receiving openings 112, 114 adjacent the innermost end thereof. Openings 112, 114 are similar to and perform the same functions as openings 102, 104 as will be described in greater detail hereinafter. It should be noted from FIGS. 1–4 that elongated seat bar member 100 and lower frame member portion 110 are mounted to their respective first cross brace portions 94, 96 in a manner such that when they are in proper alignment, members 100, 110 will be parallel to each other and parallel to the upper and lower frame members 10, 12.

Second cross brace portion 98 comprises an open ended cylinder dimensioned to closely slidably receive first cross brace portions 94, 96 in the opposite ends thereof. As will be seen from FIGS. 5–8, a first set of locking member receiving openings 120 are disposed at spaced apart intervals longitudinally along the second cross brace portion from each end thereof. In addition, a second set of locking member receiving openings 122 are similarly disposed at spaced intervals longitudinally along the second cross brace portion but spaced 90° from first set 120. The spacing of individual openings comprising sets 120 and 122 are identical at each end of the second cross brace portion. Moreover, the individual openings extend completely through the tube for purposes of receiving a locking member as will be described hereinafter. It should also be noted that the spacing of and between the openings in sets 120, 122 are not identical and are utilized for different wheel chair height and width adjustments as will also be described hereinafter.

Disposed generally midway between the ends of second cross brace portion 98 and on opposite sides thereof are inwardly extending recessed areas 124 with a pivot mounting pin 126 extending therethrough. Recessed areas 124 are included in the second cross brace portions of both cross brace assemblies 90, 92 and are for purposes of providing an area of cooperation allowing scissors-like pivotal movement about pivot mounting pin 126 which interconnects them. Locking member receiving openings 102 in first cross brace portion 94 and locking member receiving openings 112 in first cross brace portion 96 are adapted for selective registry with the openings in the opening sets 120 in the associated end of second cross brace portion 98. Locking member receiving openings 104, 114 are similarly disposed but for selective registry with the openings in the opening sets 122. Conventional hitch pin clips 128 (FIGS. 5 and 6) are employed to lock the first and second cross brace portions in the desired telescoped relationship by being passed through those locking openings of portions 94, 96 and 98 which have been placed in selective registry. The reason for spacing the openings in sets 120, 122 90° apart in second cross brace portion 98 is to provide some spacing between the individual locking member receiving openings. While it might be possible to place all the locking member receiving openings in line and on one side of the second cross brace portion rather than having some of them spaced 90° apart from the others, some of the locking member receiving openings would tend to be run together so as to cause adjustment or operational difficulties. This is particularly the case where the wheel chair design is intended to provide quite a number of individual seat height and width adjustments.

Referring again to FIGS. 3 and 4, it will be seen that frame member portion 110 of first cross brace portion 96 is coaxially mounted with rear portion 18 of lower frame member 12. First cross brace portion 96 is mounted in this position so it is, through lower frame member portion 110, arcuately movable about lower frame member 12. This construction may be accomplished in several different ways, however, in the preferred structure here under discussion, lower frame member 12 and lower frame member portion 110 have the same cross sectional dimensions so as to receive a retaining rod 140 therethrough. This retaining rod is then positively mounted within the lower frame member by any convenient means such as conventional rolled pins or threaded fasteners generally designated 142. These pass through the lower frame member into retaining bar 140 on each side of lower frame member portion 110. The retaining bar is dimensioned to be slidably received through lower frame member 12 and lower frame member portion 110 thus resulting in pivotal movement of first cross brace portion 96.

Figure 4:
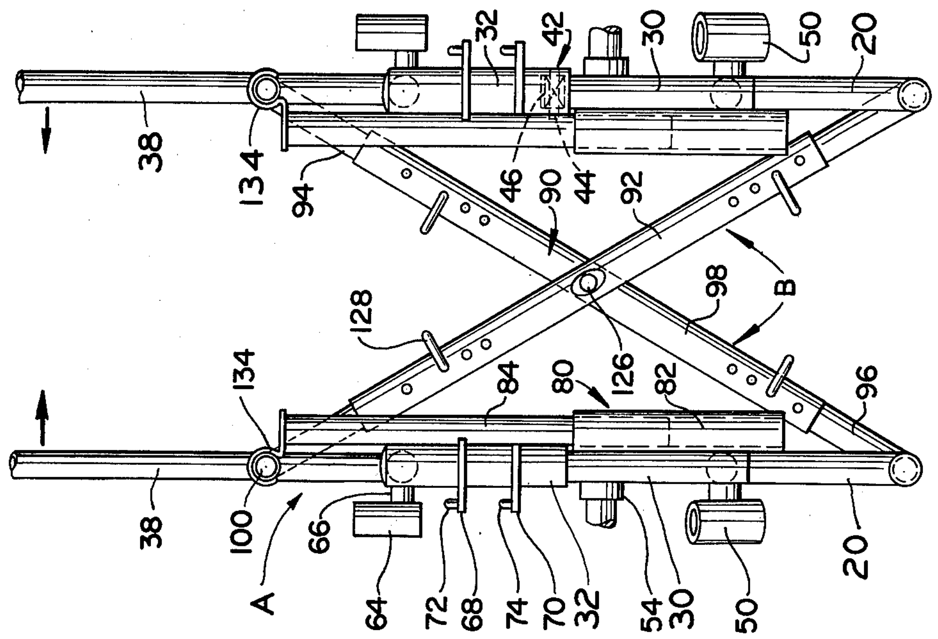
FIG. 4 is a front view of the structure shown in FIG. 3.

Both cross brace assemblies B are affixed in the same manner to their associated side frame assembly A and, as best shown in FIG. 4, these assemblies form a generally X-like configuration. The lower end of each cross brace assembly is pivotally mounted to lower frame member 12 of one of the side frame assemblies A with the upper end thereof which includes seat bar member 100 extending to a position adjacent and immediately above upper frame member 10 of the other or opposite side frame assembly. A retaining bracket 134 is rigidly affixed to the uppermost end of guide member 84 of seat guide assembly 80 and engages the associated seat bar member 100 in a manner which permits pivotal movement between the seat bar members and retaining bracket. The reasons for this construction will become apparent hereinafter. With the above described structure, upper frame members 10 of the two side frame assemblies A act as seat bar member stops since retaining brackets 134 are configured so as to engage and retain the seat bar members generally vertically above and immediately adjacent to the associated upper frame member 10.

Figure 1:
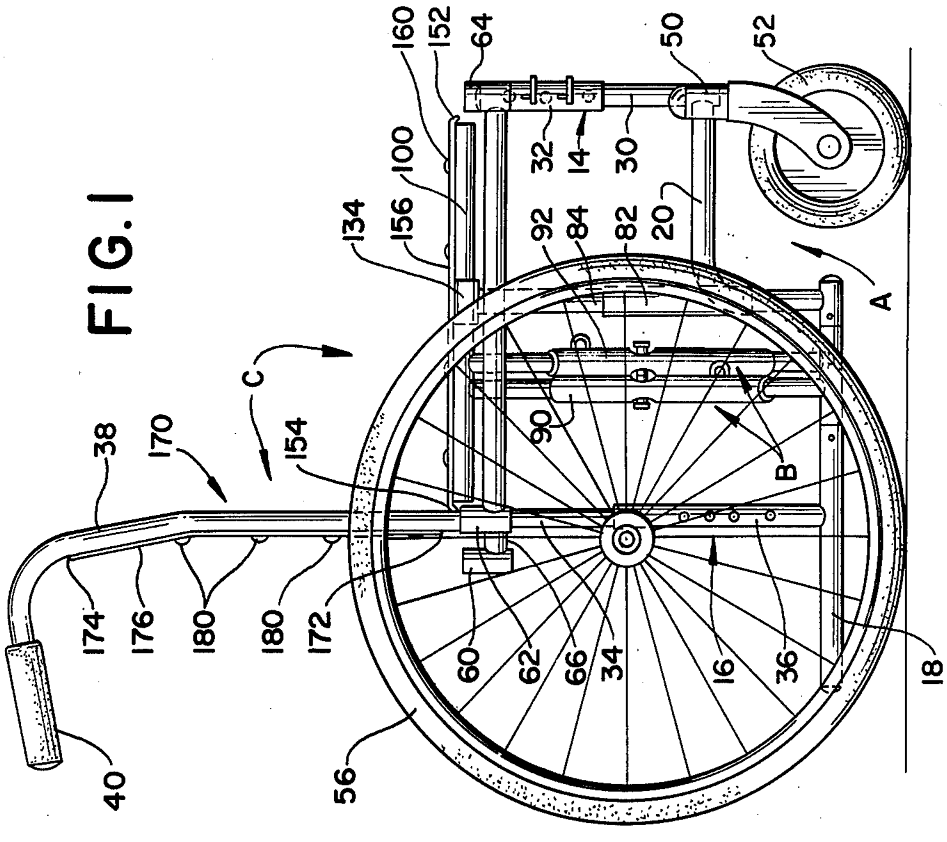
FIG. 1 is a side elevational view of the subject new wheel chair design.

In FIGS. 1 and 2, a flexible seat 150 having a front edge 152, a rear edge 154 and opposed side edges 156, 158 is connected to the two opposed elongated bar members 100 along the side edges thereof. In the preferred embodiment, mechanical fasteners 160 such as rivets, snaps or threaded fasteners may be conveniently employed at spaced intervals along the side edges for connecting purposes although other means for mounting the seat could also be advantageously employed. Seat 150 is constructed from a flexible material such as cloth, vinyl, canvas, leather and the like in order to facilitate relative movement between the side frame assemblies as will hereinafter be further described.

Also as shown in FIGS. 1 and 2, a flexible seat back 170 having a bottom edge 172, a top edge 174 and spaced apart opposed side edges 176, 178 is mounted between seat back support or frame members 38 of rear frame member 16. The seat back is positioned such that the bottom edge 172 and rear edge 154 of flexible seat 150 are closely disposed adjacent each other. The seat back is mounted by mechanical fasteners 180 in a similar manner as hereinabove discussed with reference to the flexible seat and is also constructed of similar materials.

Both the seat and seat back include longitudinally extending releasably connected seams 190. Although a seam is only actually shown with regard to the seat back 170 in the FIGURES, an identical seam is included in seat 150. The seams allow flexible spacer members to be inserted into the seat and seat back for altering or adjusting their widths commensurate in scope with adjustments made to the wheel chair frame itself. In the preferred embodiment of the invention, seams 190 are comprised of zippered connections 192, 194 which can be made to cooperate with corresponding zippers on the longitudinal side edges of flexible spacer members. FIG. 9 shows such a flexible spacer member 200 having zippers 202, 204 on opposite side edges thereon engaged with zippers 192, 194 which comprise seams 190. Other convenient connecting means besides zippers could also be advantageously employed without departing from the intent and scope of the present invention.

Figure 3:
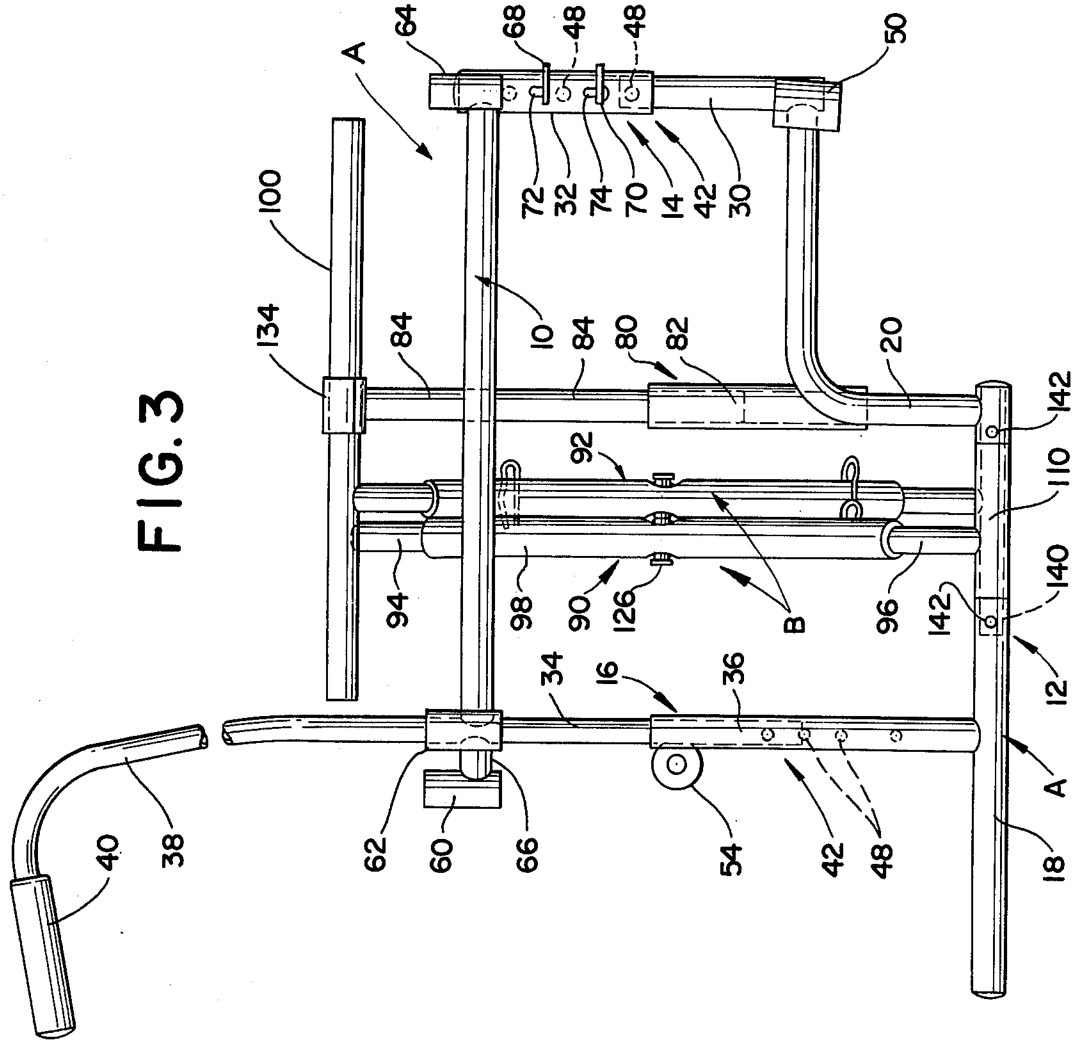
FIG. 3 is a side elevational view of the subject new wheel chair design showing only the basic framework for ease of illustration with the wheel chair moved to a partially collapsed condition.

With the specific construction hereinabove described, there is provided a wheel chair construction which may be folded between a first closed or collapsed condition for storage wherein the two side frame assemblies A are closely spaced to each other and a second opened condition with the side frame assemblies spaced apart from each other whereby the wheel chair may be employed in its intended manner. The second position of the wheel chair is shown in FIGS. 1 and 2 and the wheel chair as moved partially toward the first position is shown in FIGS. 3 and 4.

In addition to the collapsible nature of the wheel chair, the seat height and seat width are independently adjustable relative to each other by means of the telescoping nature of front and rear frame members 14, 16 and cross brace assemblies 90, 92. The adjustment distances in the front and rear side frame members are interrelated to certain of the adjustable positions of the two cros brace assemblies. Thus, if it is desired to only raise or lower the seat height from one position to another, it is simply necessary to release button or locking members 44 from their initial locked positions with particular locking member receiving openings 48 and longitudinally extend or contract first portions 30, 34 relative to the associated second portions 32, 36, Of course, these adjustments are made to the front and rear frame members of both said frame assemblies. When the height is being adjusted, it is also necessary to adjust the length of cross brace assemblies 90, 92 slightly to compensate for the change in seat height. This is done by removing hitch pins 128 so that proper registry between the various locking member receiving openings in the first and second cross brace portions may be made and then reinserting the hitch pins to retain the cross brace assemblies in those positions. When only height adjustments are being made, no modifications to the seat and seat back must be made.

In the event it is merely desired to expand or narrow the seat width, it is only necessary to adjust the effective lengths of cross brace assemblies 90, 92 in a similar manner as hereinabove just described. Moreover, it will be necessary to insert the appropriate flexible spacer member 200 to accommodate the particular width desired.

In view of the fact that there may be a substantial number of individual height and width settings, these settings on first and second portions 30, 34 and 32, 36 of front and rear frame members 14, 16 and first and second cross brace portions 94, 96 and 98 of cross bar assemblies 90, 92 may include convenient locating indicia. For example, numbers or the like disposed adjacent the various locking member receiving openings can be easily provided in order that the various available seat height and width adjustments may be made quickly and directly without necessitiating trial and error methods. Typical indicia is shown in FIGS. 7 and 8 by those numerals disposed adjacent the first and second set 120, 122 of locking member receiving openings in second cross brace portion 98. These same means are equally applicable to the other adjustable portions of the subject wheel chair structure and other, alternative identifying indicia could also be advantageously employed.

When the side frame assemblies A are moved from the second toward the first position, guide members 84, acting within guide receivers 82, direct elongated seat bar members 100 upwardly from their close association with upper frame members 10 in a generally vertical plane. The feature is best seen in FIGS. 3 and 4. Moreover, when the side frame assemblies are moved from the first back to the second position, these seat guide assemblies guide the seat bar members to a position spaced immediately ajdacent and above frame memers 10 and generally parallel thereto so that the upper frame members act as seat stops. This aspect is best shown in FIGS. 1 and 2.

In some instances, it is desirable to provide a head rest for the comfort of a patient or user of the wheel chair. While several alternative arrangements may be employed for this purpose, the specific arrangement shown in FIGS. 10 and 11 providing a separate head rest structure is preferred. The head rest shown in these two FIGURES acts to define a hear rest area and is readily adapted to use with the particular wheel chair structure hereinabove described with reference to FIGS. 1–9.

Figure 10:
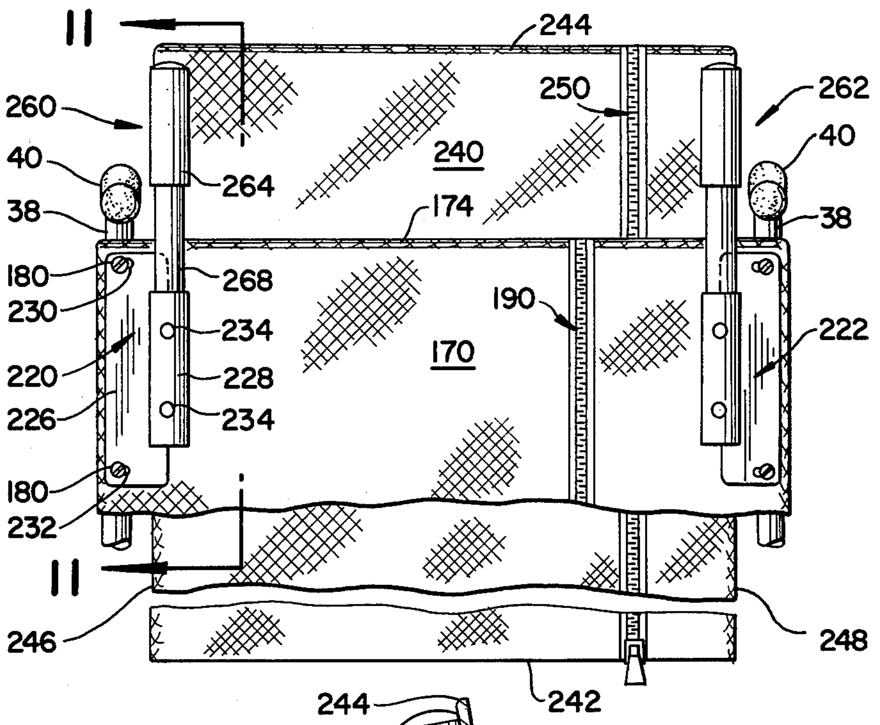
FIG. 10 is a partial rear view of the wheel chair showing an adjustable head rest structure; and, FIG. 11 is a cross sectional view taken along lines 11—11 in FIG. 10 and slightly enlarged for ease of illustration.
Figure 11:
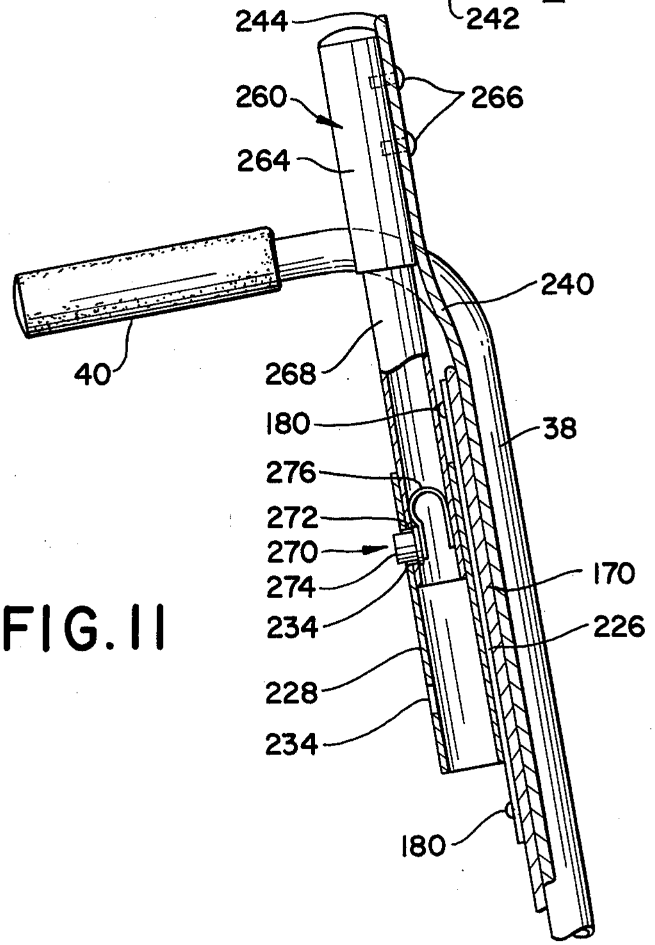

In FIGS. 10 and 11, the head rest structure includes a pair of back tube brackets 220, 222 affixed to the seat back support or frame members 38 for purposes of mounting the structure to the wheel chair. Inasmuch as the two back tube brackets are identical to and opposite from each other, description will hereinafter be made with reference to bracket 220, it being understood that bracket 222 is identical thereto.

Bracket 220 is comprised of a bracket plate 226 having an open ended tube receiving cylinder 228 rigidly affixed thereto. The bracket plate includes a pair of slots 230, 232 disposed adjacent the top and bottom edges thereof. These slots are conveniently spaced apart from each other so as to be in registry with and receive the two uppermost mechanical fasteners 180 for purposes of fixedly mounting bracket 220 to the wheel chair. The use of slots as a mounting means permits some lateral adjustment of bracket 220 relative to the associated support or frame member 38 to properly locate and mount the head rest to the wheel chair. If desired, separate mechanical fasteners other than fasteners 180 could be conveniently employed to mount bracket 220 to the wheel chair. Tube receiving cylinder 228 includes a plurality of locking member receiving openings 234 spaced longitudinally therealong to facilitate head rest adjustment as will be more fully described hereinafter. Although only two such openings are shown in the FIGURES other numbers could also be employed. Also, convenient identifying indicia can be included adjacent the openings to identify the different adjusted positions of the head rest. It should also be noted that tube receiving cylinder 228 is disposed to extend generally parallel to the associated support or frame member 38.

Head rest 240 is constructed from the same or a similar flexible material previously discussed in detail with regard to seat 150 and seat back 170. The head rest has a bottom edge 242, a top edge 244 and spaced apart side edges 246, 248. The head rest also includes a longitudinally extending, releasably connected seam 250 substantially identical to seams 190 as discussed above in detail with reference to the seat and seat back. When the wheel chair is adjusted to a width position such as that shown in FIG. 2, seam 250 will look the same as seams 190 therein and when the width of the wheel chair is expanded, a flexible spacer member may be added substantially identical to spacer 200 shown in FIG. 9.

Disposed adjacent side edges 246, 248 of head rest 240 are adjustable back tube assemblies generally designated 260, 262, respectively, and which are adapted to be received by tube receiving cylinder of back tube brackets 220, 222. Since these assemblies are identical, description will hereinafter be made to assembly 260 only. A back tube 264 which comprises a portion of assembly 260 is affixed to the head rest adjacent side edge 246 by convenient means such as bolts or screws 266 passing through the head rest and into the back tube itself. A back insert tube 268 is closely received in the lower end of back tube 264 and rigidly affixed thereto by any convenient means. Back insert tube 268 and tube receiving cylinder 228 of bracket 220 are dimensioned such that tube 268 may be closely slidably received in cylinder 228.

Disposed adjacent the lowermost end and inside of back insert tube 268 is a spring tube locking arrangement generally designated 270. This locking arrangement has a portion thereof protruding outwardly from a locking member opening 272 in tube 268. The locking arrangement is comprised of a locking button 274 which is continuously urged outwardly of opening 272 by convenient spring biasing means 276. In the preferred arrangement here under discussion, a leaf type spring is advantageously employed although other arrangements could also be used.

With the above structure, back insert tubes 268 of back tube assemblies 260, 262 are closely slidably received in tube receiving cylinders 228 of back tube brackets 220, 222, respectively. Head rest 240 is disposed so that the rear face thereof rests adjacent the front face of seat back 170. Bottom edge 242 of the head rest extends toward bottom edge 172 of the seat back and top edge 244 of the head rest is disposed above top edge 174 of the seat back. Thus, the upper area of head rest essentially acts as a continuation or extension of the seat back and the lower area acts as part of the seat back. In this position, the head rest may then be adjusted until it is in a desired position with buttons 274 registering with and passing through selected ones of openings 234 in tube receiving cylinders 228. The height of head rest 140 may be conveniently adjusted by simply depressing buttons 274 from engagement with one set of openings 234 and telescopically moving back insert tubes 268 in tube receiving cylinders 228 until buttons 274 engage another set of the openings 234.

In addition to the adjustable head rest arrangement specificially described above with reference to FIGS. 10 and 11, other arrangements could also be advantageously employed without departing from the intent or scope of the present invention. For example, it would be possible to construct seat back support or frame members 38 so that they would be adjustable relative to first portions 34 of rear frame members 16 and to increase the overall length of seat back 170. Here, a portion of seat back 170 itself would define the head rest area and act or function as the head rest. Moreover, it would be possible to construct each seat back support or frame member 38 from two sections which would be telescopically adjustable relative to each other so as to define a desired head rest area. Here again, a portion of the seat back would then act as the heat rest. In either of these alternatives, it would also be possible to utilize a spacer member for purposes of extending the effective length of the seat back. Such a spacer member could be releasably affixed to the seat back in a manner similar to that employed with the other spacer members heretofore discussed in detail.

In the preferred arrangement of the present invention, the various frame members and cross brace assemblies are constructed from thin walled tubular steel with the components then being welded or brazed together where rigid interconnections are required. Typically, the tubular steel framework and components will be chrome plated for appearance and protective reasons. However, it would be possible to employ other materials and construction techniques without departing from the intent and scope of the present invention.

The invention has been described with reference to the preferred embodiment. Obviously, modifications and alterations will occur to others upon the reading and understanding of this specification. It is my intention to include all such modifications and alterations insofar as they come within the scope of the appended claims or the equivalents thereof.

Having thus described my invention, I now claim:

1. A collapsible wheel chair structure for permitting independent width and height adjustment of the seat, said wheel chair structure comprising in combination:

a pair of side frame assemblies disposed in a spaced apart side by side relationship, each of said side frame assemblies having upper and lower frame members, said front and rear frame members each being comprised of first and second portions longitudinally movable relative to each other;

first locking means cooperating between said first and second portions of said front and rear frame members for selectively locking said first and second portions in a desired longitudinal relationship with each other for varying the effective length of said front and rear frame members and the distance between said upper and lower frame members;

a front wheel disposed adjacent each of said front frame members and a rear wheel disposed adjacent each of said rear frame members, said front and rear wheels connected to said structure;

first and second cross brace assemblies pivotally connected together and extending generally transversely between said side frame assemblies intermediate said front and rear frame members, said cross brace assemblies each including first and second cross brace portions with one of said first and second cross brace portions being longitudinally movable relative to the other of said first and second cross brace portions, one end of one cross brace assembly being pivotally mounted to the lower frame member of one side frame assembly with the other end thereof extending to a position adjacent the upper frame member of the other side frame assembly and one end of the other cross brace assembly being pivotally mounted to the lower frame member of said other side frame assembly with the other end thereof extending to a position adjacent the upper frame member of said one side frame assembly, said cross brace assemblies permitting selective movement of said side frame assemblies relative to each other between a first closed position with said side frame assemblies closely spaced toward each other and a second opened position spaced apart from each other;

second locking means cooperating between the first and second cross brace portions of each cross brace assembly for selectively locking said first and second cross brace portions in a desired longitudinal relationship with each other for varying the effective length of said cross brace assemblies and the effective distance between said first and second side frame assemblies when said assemblies are moved to said second position;

a seat extending between said side frame assemblies and having side edges operably connected to each cross brace assembly other end;

a seat back extending between said side frame assemblies at said rear frame members thereof;

means for selectively altering the size of said seat and seat back as the spacing of the side frame assemblies is altered; and, guide means for guiding each cross brace assembly other end in a generally vertical direction as said side frame assemblies are moved between said first and second positions.

2. The wheel chair as defined in claim 1 wherein the rear frame member second portions are affixed to said lower frame members and said front frame member second portions are affixed to said upper frame members, said front and rear frame member second portions telescopically receiving said first portions.

3. The wheel chair as defined in claim 2 wherein said first locking means comprises an outwardly biased locking member in each of said front and rear frame member first portions adapted to selectively register with and be received in any of a plurality of locking memer openings disposed longitudinally along the associated second portions for adjusting the effective length of said front and rear frame members.

4. The wheel chair as defined in claim 1 wherein said cross brace assemblies are each comprised of two first cross brace portions and one second cross brace portion, said first cross brace portions being telescopically mounted to the associated second cross brace portion at opposite ends thereof, said first and second cross brace portions including said second locking means whereby each of said first cross brace portions may be axially adjusted relative to the associated second cross brace portion for varying the distance between said side frame assemblies when said assemblies are in said second opened position.

5. The wheel chair as defined in claim 4 wherein said first cross brace portions are telescopically received in the associated second cross brace portion and said second cross brace portions themselves are pivotally connected to each other at generally the midpoints thereof, at least one of said first and second cross brace portions including a plurality of openings spaced longitudinally therealong and adapted to register with at least one opening in the other of said first and second cross brace portions to permit a locking member to be received therethrough.

6. The wheel chair as defined in claim 1 wherein said cross brace assemblies each include an elongated seat mounting bar disposed at said cross brace assembly other ends with said mounting bars extending generally parallel to said upper frame members and the opposed side edges of said seat operably connected therewith, each of said seat mounting bars being moved to a position spaced generally vertically above an associated upper frame member when said side frame assemblies are moved to said first closed position and being moved to a position adjacent an associated upper frame member when said side frame assemblies are moved to said second opened position, said guide means guiding said seat mounting bars through generally vertical planes as the side frame assemblies are moved between said first and second positions.

7. The wheel chair as defined in claim 6 wherein said guide means are operably disposed between each side frame assembly and the seat mounting bar associated therewith, each guide means comprising a telescoping structure with one end affixed to the associated of the side frame assemblies and the other end pivotally communicating with the associated of the seat mounting bars.

8. The wheel chair as defined in claim 1 wherein the pivotal mounting of said one ends of said cross brace assemblies to said lower frame members cooperates with said lower frame members so as to comprise a portion of the length thereof.

9. The wheel chair as defined in claim 1 including means associated with said seat back for varying the effective length thereof to define a head rest area.

10. The wheel chair as defined in claim 9 wherein said varying means comprises a separate head rest structure extending between said side frame assemblies at said rear frame member thereof adjacent at least the uppermost end of said seat back.

11. The wheel chair as defined in claim 10 wherein said head rest structure is selectively movable relative to said wheel chair and seat back to facilitate size adjustment for said head rest area.

12. A collapsible wheel chair structure for permitting independent width and height adjustment of the seat, said wheel chair structure comprising in combination:

- a pair of side frame assemblies disposed in a spaced apart side by side relationship, each of said side frame assemblies having upper and lower frame members rigidly interconnected to front and rear frame members, said front and rear frame members each being comprised of first and second portions longitudinally movable relative to each other;
- first locking means cooperating between said first and second portions of said front and rear frame members for selectively locking said first and second portions in a desired longitudinal relationship with each other for varying the effective length of said front and rear frame members and the distance between said upper and lower frame members;
- a front wheel disposed adjacent each of said front frame members and a rear wheel disposed adjacent each of said rear frame members, said front and rear wheels connected to said structure;
- first and second cross brace assemblies pivotally connected together and extending generally transversely between said side frame assemblies intermediate said front and rear frame members, said cross brace assemblies each including first and second cross brace portions being longitudinally movable relative to the other of said first and second cross brace portions, one end of one cross brace assembly being pivotally mounted to the lower frame member of one side frame assembly with the other end thereof extending to a position adjacent the upper frame member of the other side frame assembly and one end of the other cross brace assembly being pivotally mounted to the lower frame member of said other side frame assembly with the other end thereof extending to a position adjacent the upper frame member of said one side frame assembly, said cross brace assemblies permitting selective movement of said side frame assemblies relative to each other between a first closed position with said side frame assemblies spaced toward each other and a second opened position spaced apart from each other;
- second locking means cooperating between the first and second cross brace portions of each cross brace assembly for selectively locking said first and second cross brace portions in a desired longitudinal relationship with each other for varying the effective length of said cross brace assemblies and the effective distance between said first and second side frame assemblies when said assemblies are moved to said second position;
- a seat extending between said side frame assemblies and having side edges operably connected to each cross brace assembly other end;
- a seat back extending between said side frame assemblies at said rear frame members thereof;
- means for selectively adjusting the widths of said seat and seat back comprising releasable means for permitting installation and removal of spacer members in both said seat and seat back; and,
- guide means for guiding each cross brace assembly other end in a generally vertical direction as said side frame assemblies are moved between said first and second positions.

13. An improvement for permitting individual width and height adjustments in a wheel chair of the general type having a pair of opposed side frame assemblies with each frame assembly having interconnected front, rear, upper and lower frame members and first and second cross brace assemblies pivotally interconnected with at least the lower ends of the cross brace assemblies being oppositely interconnected to the lower frame members so as to form a generally X-shaped configuration intermediate said front and rear frame members, a seat extending between said side frame assemblies and operably connected to said cross brace assemblies, a seat back extending between said rear frame members in a generally vertical disposition above said seat, and front and rear wheels operably interconnected to each frame assembly, the improvement comprising:

said front and rear frame members each having first and second portions longitudinally movable relative to each other, first locking means cooperating between the first and second portions of said front and rear frame members for selectively locking said first and second portions in a desired longitudinal relationship with each other for varying the effective length of said front and rear members and the distance between said upper and lower frame members; said first and second cross brace assemblies each including first and second cross brace portions being longitudinally movable relative to the other of said first and second cross brace portions, one end of one cross brace assembly being pivotally mounted to the lower frame member of one said frame assembly with the other end thereof extending to a position adjacent the upper frame member of the other side frame assembly and one end of the other cross brace assembly being pivotally mounted to the lower frame member of the other side frame assembly with the other end thereof extending to a position adjacent the upper frame member of said one side frame assembly, said cross brace assemblies permitting selective movement of said side frame assemblies relative to each other between a first closed position with said side frame assemblies closely spaced toward each other and a second opened position spaced apart from each other, second locking means cooperating between the first and second cross brace portions of each cross brace assembly for selectively locking said first and second cross brace portions in a desired longitudinal relationship with each other for varying the effective length of said cross brace assemblies and the effective distance between said first and second side frame assemblies when said assemblies are moved to said second position; an elongated seat mounting bar affixed to each of said cross brace assembly other ends and disposed generally parallel to said upper frame members with the side edges of said seat operably connected thereto; means for selectively adjusting the width of said seat and seat back comprising releasable means for permitting installation and removal of spacer members in both said seat and seat back; and, guide means for guiding each of said seat bars in a generally vertical direction as said side frame assemblies are moved between said first and second positions, whereby said seat bars are disposed adjacent the associated of said upper frame members when said frame assemblies are in said second position and generally vertically above said associated of said upper frame members when said frame assemblies are in said first position.

* * * * *